Figure 2:
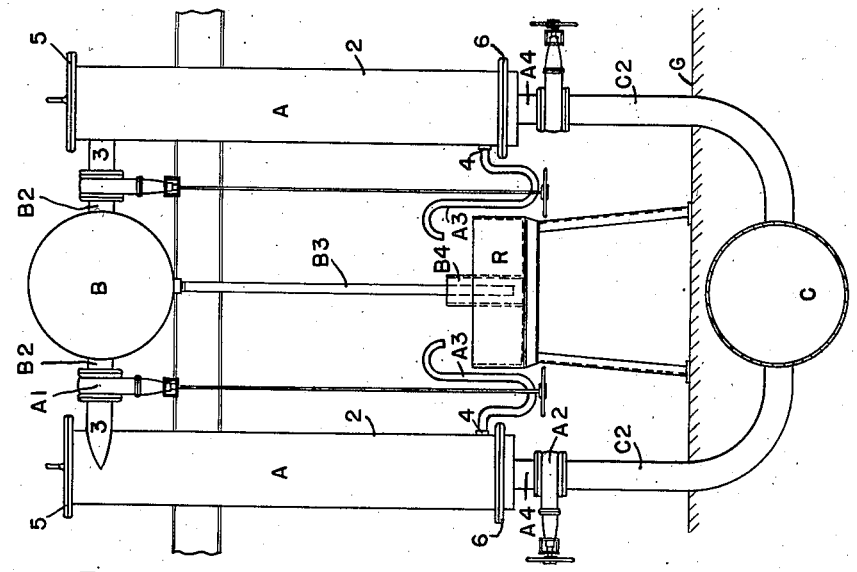

Oct. 1, 1940.   C. G. HAWLEY   2,216,389
EXTRACTOR
Filed Jan. 13, 1938   4 Sheets-Sheet 1

INVENTOR
CHARLES G. HAWLEY.
BY Mason & Mason
ATTORNEYS

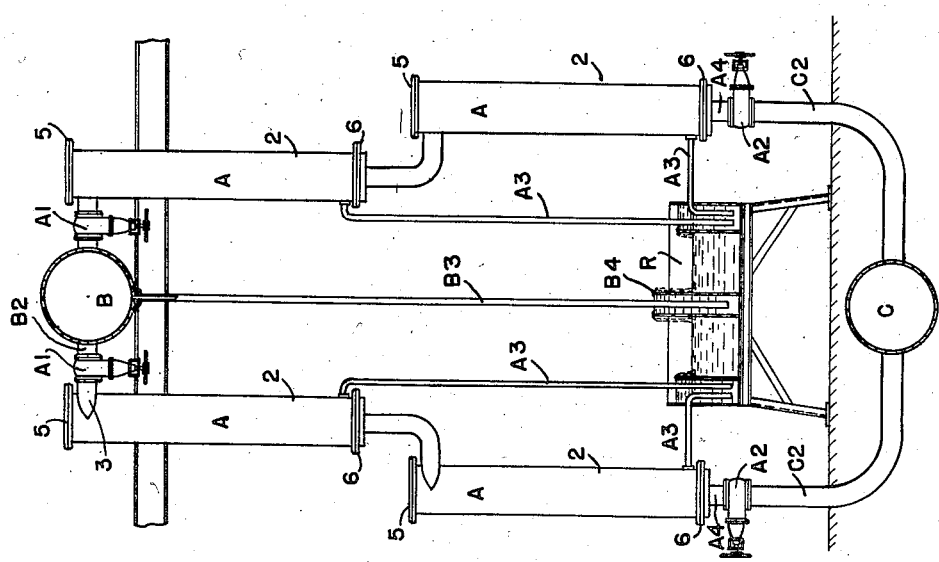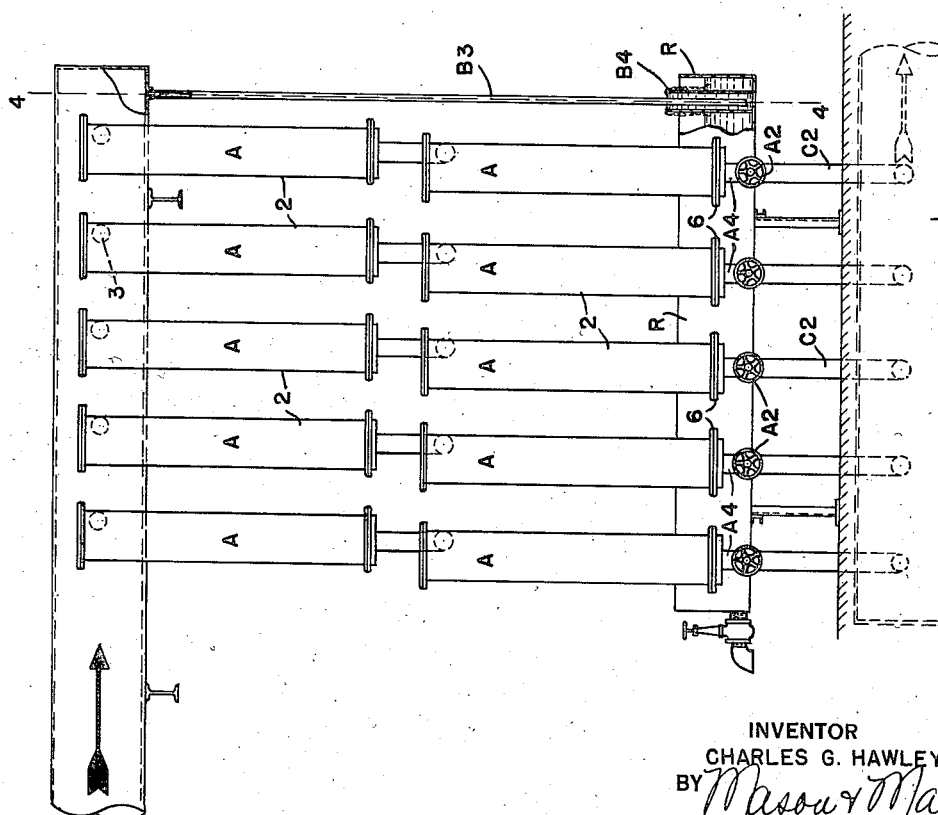

INVENTOR
CHARLES G. HAWLEY.
BY Mason & Mason
ATTORNEYS

Oct. 1, 1940.          C. G. HAWLEY          2,216,389
                          EXTRACTOR
                    Filed Jan. 13, 1938          4 Sheets-Sheet 4

INVENTOR
CHARLES G. HAWLEY.
BY  *Mason & Mason*
       ATTORNEYS

Patented Oct. 1, 1940

2,216,389

UNITED STATES PATENT OFFICE 2,216,389

EXTRACTOR

Charles Gilbert Hawley, Cleveland, Ohio, assignor to Centrifix Corporation, Cleveland, Ohio, a corporation of Ohio Application January 13, 1938, Serial No. 184,857

2 Claims. (Cl. 183—82)

This present invention and application incorporates the process which was first described in my pending application S. N. 22,252 of May 18, 1935, and also comprises certain improvements of apparatus which extend the usefulness of that invention.

Air, gases and vapors are moved through pipes or conduits in both hot and cold conditions and many such streams are burdened or fogged with minute particles of liquid or with vapors which become liquid when condensed. The burden or fog should be removed before the air, steam, fixed gas, or, vapor is devoted to its intended use; and, such is the purpose or object of the present invention. This application is a continuation in part of application Serial No. 22,252, filed May 18, 1935, which has matured into Patent 2,117,718, dated May 17, 1938, covering the original apparatus as distinguished from the process here claimed. This present application also presents certain improvements in the apparatus disclosed in the earlier application and by which also the original process may be carried out.

A most difficult problem is presented when the purification of manufactured gas is attempted, particularly when the temperature thereof has been reduced to a point which causes the contained tar to assume a liquid state, finely subdivided.

By way of example, the following description will be directed to the particular use and adaptation of the invention as a tar fog extractor. Such description will serve to disclose the details of the invention, in various desirable forms, and, will make it plain that the invention is not restricted to that one use but is of broad utility in the purification of various aeriform fluids which are in a state of swift movement, as within conduits or pipes.

Whatever the nature of the aeriform fluid to be treated it will be spoken of as "gas" and the herein used word "tar" is to be taken as standing for the comminuted matters to be intercepted and removed. Dusts are likewise included, particularly when associated with liquid sprays or particles.

By preference and to both ensure and enable very efficient purification of great volumes of gas, the invention is constructed in multiple form. This is, the apparatus is made up of a number of identical units, all deriving gas from an inlet main or header, and all delivering purified gas to a departure main, usually leading into a gasometer.

Each said unit comprises a single piece of apparatus wherein centrifugal forces are made to accomplish first an agglomeration and then a final segregation or separation of the tar or like comminuted matter, thus conditioning the gas for safe and satisfactory use.

No part of said unit is rotated or even capable of rotation; instead, the unit is wholly composed of fixed parts, so arranged as to direct the passing gas into vortical movements which, assisted by the presence of impact or collecting surfaces, bring about a truly centrifugal purification of the gas.

Specifically, an important element of each unit comprises internal means by which the impure or burdened gas is permitted momentary expansion and is subdivided into a plurality of thin downward moving gas streams; each in vortical or whirling movement about a vertical axis, under the restraint of said means.

The gas subdividing means referred to comprises extensive vertically cylindrical and concentric surfaces, through each of which cylindrical shapes the gas proceeds spirally downward in an axial direction. Due to the centrifugal forces evolved, the minute particles of tar contained by the gas are caused to impact the described surfaces and by reason of relative surface tensions momentarily adhere thereto, forming thin layers or films which do not interfere with the downward and outward passage of the gas.

As will be apparent, the tar forms into films or agglomerations upon such impact surfaces and due to the thrust of the gas stream and to the force of gravity is delivered to the lower edges of the cylindrical surfaces referred to. Having been thus gathered, the tar leaves such lower edges in the direction of gas flow and in the form of drops and thread-like masses which can be readily separated from the departing gas and which have little, if any, tendency to become re-entrained therein.

To defeat such re-entrainment the falling tar masses are collected in the lower or exit part of the unit casing, thence to be discharged, and in addition a compact separator is employed as at the gas outlet of the unit.

To the end that the pressure drop through the unit as a whole shall be slight, that terminal separator is made to be of vortical and centrifugal character; and, centrifugally intercepts any last residue of tar. By preference this centrifugal separator is arranged to discharge the tar into the main body of tar collected from the upper part of the unit. And as a matter of further importance it is here mentioned that until the tar is actually drained or discharged from the lower part of the unit, the whirling gas is therein employed to keep the tar in slow rotative movement, which movement prevents sedimentation and ensures the discharge of tar of constant quality.

Still further features and details of the invention will be explained hereinafter, particularly including arrangements for modifying the temperature of the gas and tar while in the separatory process here described.

The gas passes through the described unit, or units, at high velocity and its period of retention within the described unit is limited to a mere fraction of a second, and yet, a very perfect aggregation and separation of tar is reliably accomplished.

In the case of the tar fogs of artificial gases a further pronounced effect is accomplished, to wit: The oily tar as it clings to and flows upon the internal surfaces of the described unit serves to extrude therefrom both mineral and water particles; and, such particles being thus exposed are almost completely carried away by the otherwise purified gas; for easy disposition in the gasometer.

The collected tar is of high order and value, being almost entirely free from water and ash particles.

When the invention is primarily employed to collect finely divided dusts, liquids which are more readily miscible with dust are to be supplied to the described unit; preferably warm water or light oils.

Figure 1:
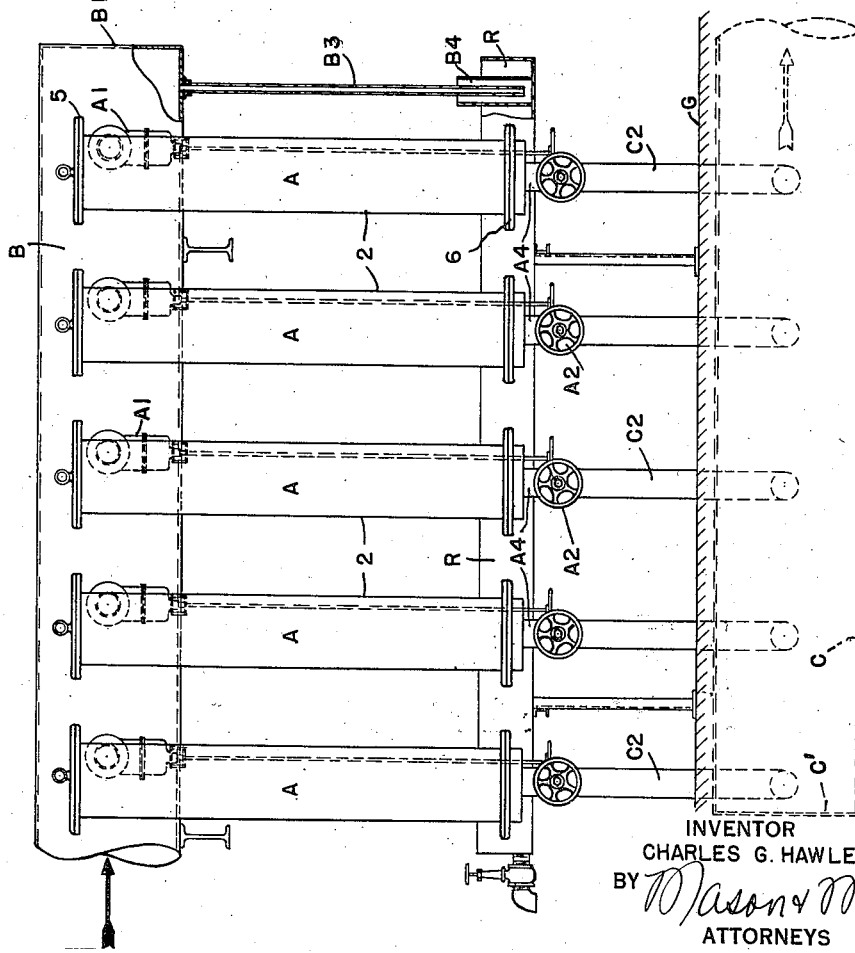
Figures 5, 6:
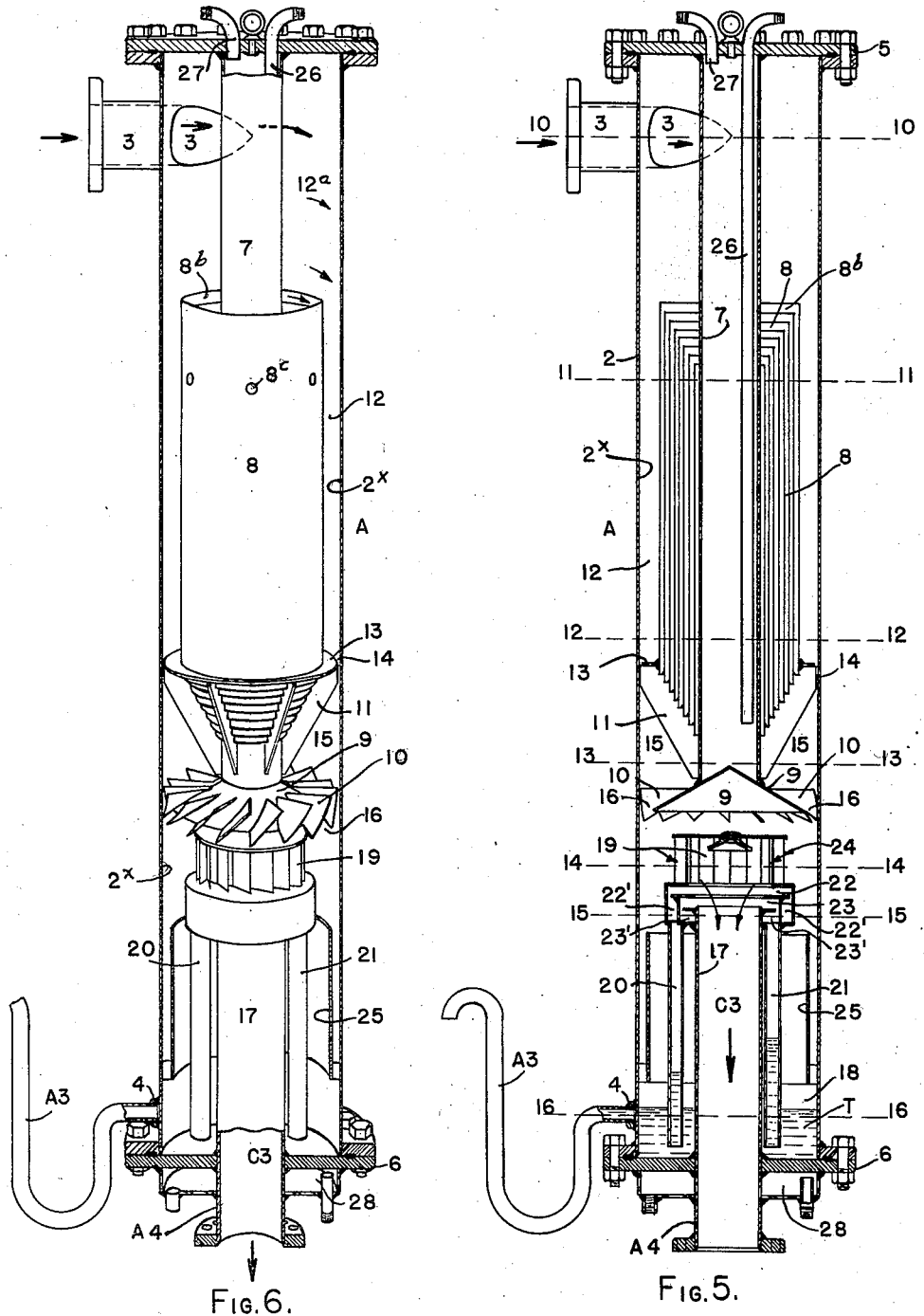
Figure 17:
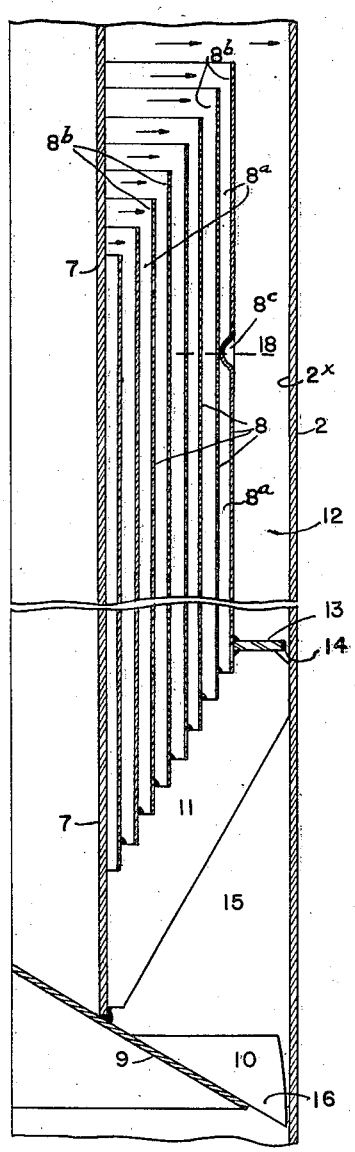
Figure 18:
Figure 8:
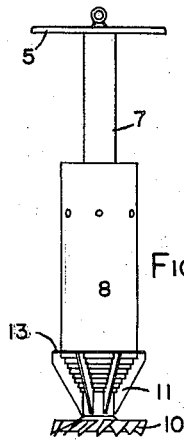
Figure 7:
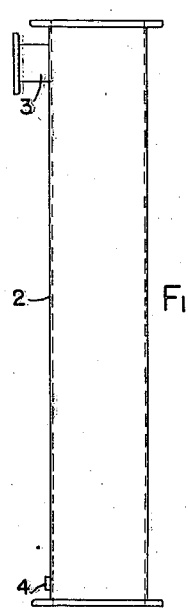
Figure 9:
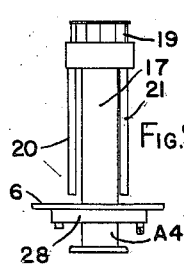

The foregoing process and the invention in its best forms will be more readily understood upon reference to the accompanying drawings, in which Fig. 1 is a side elevation of a multiple arrangement of extractor units, embodying the present invention as adapted for use in large gas plants and the like; Fig. 2 is an end elevation thereof; Fig. 3 is a side elevation like unto Fig. 1, but illustrating an extended use of the invention under most rigorous conditions as to the degree of purification required; Fig. 4 is a vertical section on the line 4—4 of Fig. 3; Fig. 5 is a vertical longitudinal section disclosing the internal construction of one of the gas purifying units or extractors hereof; Fig. 6 is a perspective view of such unit showing the casing in section, while the internal parts are shown in full lines; Fig. 7 is a detailed elevation of the casing of the unit on a reduced scale; Fig. 8 illustrates the upper internal parts of a unit as they appear when removed from said casing; Fig. 9 illustrates the lower internal parts of the unit as they appear when withdrawn from the casing; Figs. 10, 11, 12, 13, 14, 15 and 16 are horizontal sections taken upon respective lines 10 to 16 of Fig. 5; Fig. 17 is an enlarged sectional detail better illustrating the assembly and mounting of the film accumulating cylinders peculiar to this invention; and, Fig. 18 is a sectional detail substantially on the line 18— of Fig. 17.

The basic process comprehended by this invention as above described, is practiced with the aid of a novel basic apparatus comprising vertically extended centrifugal extractor units (marked A); of intentionally limited diameter and capacity, as will be explained.

In practice the number of such units (A) to be employed is determined by the total volume of gas to be treated, each unit being of relatively small gas capacity. They are identical; and, preferably are of the construction detailed in Figs. 6 to 18. It is best to employ enough such units to care for a maximum flow of gas and to reduce the number in operation when the total flow is reduced.

As will appear, these units are capable of efficient operation within a very considerable range of gas flow, but to obtain the best results each unit should be operated within such a range. They do not operate well at low rates and if used at excessive rates develop back pressures that are objectionable from the standpoint of the power ordinarily employed to propel the gas in the gas mains.

While gas delivery is usually accomplished at substantially constant and comparatively low pressure, it is rarely convenient to quickly or arbitrarily vary the volume of the gas at the ruling pressure. For great volumes, all of the centrifugal units composing a multiple group will be required, whereas smaller volumes of gas of ruling low pressure may be cared for in fewer units or even in a single extractor unit.

To conform with varying requirements, the units hereof are provided with individual shut-off valves A', which valves may be automatically opened and closed in response to variations in the delivery or flow of gas from the manufacturing plant or other source. In contrast with automatic operation and as changes of flow take place slowly, it usually suffices to manually operate the shut-off valves A', as herein suggested.

Most commonly, and as shown in Figs. 1 and 2, the gas reaches the purifying station through a large inlet main or header B and departs therefrom through an outlet main or header C. One end of each main is closed, as shown at B' and C', respectively; and, the described centrifugal units A, serve to join these headers or parts of the gas main. To that end the upper part of each unit A is connected with the inlet main B by a relatively small pipe B2, containing the shut-off valve A'. The lower end of each unit is connected with the outlet main by a like small pipe C2, usually containing another shut-off valve A2.

By using two valves for each unit, any unit may be completely cut off from the headers B and C, and then that unit may be safely opened, and safely inspected, cleaned or repaired. Cleaning is not often required, for these units when used as extractors of tar and like fluid products are effectively self-cleaning; and repairs are rarely required. As shown, the valves are conveniently arranged for operation from the ground or floor level G.

The part marked R is a trough or container provided for the reception of the tar extracted or separated from the passing gas, as soon to be explained; the tar reaching the trough R through properly "sealed" drain or discharge pipes A3, leading from the bottoms of respective units A.

The pipe B3 serves to drain liquid, if any, from the closed end of the main B. The lower end of that pipe is liquid sealed in a device B4, located in the end of the tar trough R.

Figs. 3 and 4 represent a multiple arrangement identical with Figs. 1 and 2, except that, in each instance, two units, A, are arranged in tandem, between the upper and lower gas mains. By such an arrangement a last residue of tar may be removed from the passing gas. The only drawback is that the normally low pressure drop through one said unit is substantially doubled when this tandem arrangement is used; a measure however quite worth while whenever complete gas purity is required.

The arrangement of the main inlet section B, above the outlet section C, is typical of gas works practice. Other arrangements are feasible, provided in every case the gas is directed into the upper parts of the units A, so that both the gas and the separated product may flow downward therein, there to change direction and be separately discharged.

The invention is not limited to the downward departure of the gas from the bottom of the unit, for by a simple change in the hereinbefore mentioned separating means at the gas outlet of the unit the gas may be exhausted through the top of the described extractor unit. To exhaust gas through the side of the unit is also possible but involves an arrangement which makes assembly and dismemberment difficult.

The opening statements of this specification make clear all essentials pertaining to the internal construction and operation of these extractor units. However, it is desired to present all essentials in the best forms thus far devised, and therefore attention is now directed to Figs. 5 to 18, wherein the best of constructions and proportions are exhibited.

In practice, each extractor unit A most conveniently comprises three main elements, each complete in itself and which are easy to put together and to take apart. These elements, being there separated, are best distinguished in Figs. 7, 8 and 9.

Figure 10:
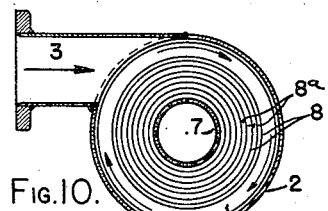
Figure 11:
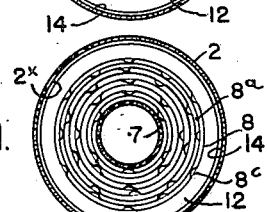
Figure 12:
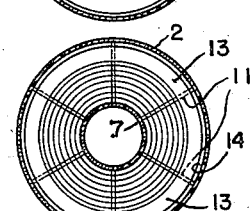
Figure 13:
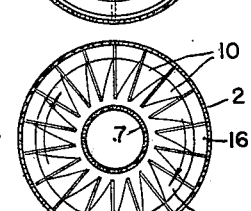
Figure 14:
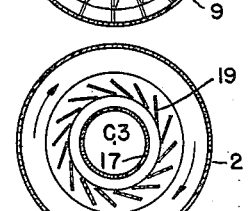
Figure 15:
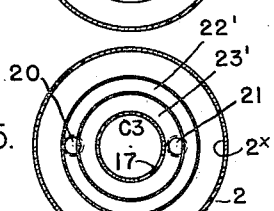
Figure 16:
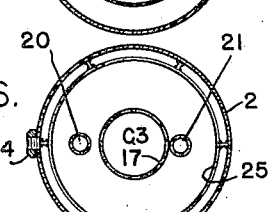

The first or external element (Fig. 7) comprises an extended cylindrical casing 2 having at its top a tangential gas inlet pipe or nozzle 3 (see also Fig. 10). Any suitable equivalent may be substituted to cause the gas to whirl within the casing but so far as known, all substitutes involve higher pressure drops than does the simple tangential nozzle shown.

The lower part of the casing is provided with a tar outlet 4.

As before stated, this extractor unit, though high, is of small diameter; a limitation imposed to ensure the high centrifugal separating efficiency of the unit. Indeed, in practice the diameter of the casing may be only twice that of its gas inlet nozzle 3, and need never be more than three times that of said inlet nozzle. Further, the lowest possible operating pressure losses are obtained by maintaining this small casing diameter.

The gas outlet A4 of the casing is provided by or incorporated with one of the internal elements shown in Figs. 8 and 9. Those elements include respective heads or closures 5 and 6, for the otherwise open ends of the casing 2 (see Figs. 5 and 6). And by means of these heads, normally fixed upon the casing, the said internal elements are fixed against rotation within the casing.

The structure separately shown in Fig. 8 and more fully disclosed in Figs. 5 and 6, is termed the impact receiving element of this device and as shown normally occupies the initial gas expansion space 12a, 12, comprising the upper part of the casing 2. By means of this impact element the entering gas is subdivided into many thin streams and the contained liquid particles are caught and formed into generally cylindrical films; preparatory to the formation of dripping or separated tar masses and their final separation from the gas; all as described in the opening of this specification.

Further referring to the impact element, a tall central tube 7, fastened to the casing head 5, serves as a supporting member and holds in position a plurality or nest of shorter, concentric, thin walled cylinders 8;—also a conical spreader 9, and a radially-bladed, whirl-promoting tuyère comprising inclined blades 10; incorporated with the tube 7 and the cone 9. The tube 7 is closed at top and bottom and also serves as a tempering device, to which further reference will be made.

At the foot of the tube 7, a plurality of inverted notched brackets 11 fixed upon the tube, serve to concentrically support and fixedly hold the nested cylinders 8 in proper spaced relation.

Short studs 8c formed in or upon their upper parts assist in spacing the concentric cylinders 8; particularly until they are fastened to the spacing brackets 11.

As will be observed, the cylinders 8 are partially telescoped, thus providing marginal internal top portions 8b for the initial reception of whirling gas and tar and serving to guide the gas spirally into respective annular spaces 8a.

In practice, the spaces 8a, between the cylinders 8, are wider than the thickness of any film of tar or the like forming thereon as described; and, most practically, said spaces are wider than a drop of such liquid; thus to avoid possible capillary retention of tar masses between adjacent cylinders. Therefore, the spaces 8a are constantly open for the whirling passage of gas from top to bottom thereof.

Obviously, the thin supporting brackets 11 do not interfere with the downward passage of the gas and do assist in freeing tar from the lower edges of the cylinders, as before mentioned.

The largest cylinder 8 is of considerably smaller diameter than the interior of the casing 2, and yet the aggregate free area of the passages 8a is several times greater than the cross-sectional area of the inlet nozzle 3, allowing ample time for the centrifugal disposition of liquid particles upon the extensive inner impact-receiving surfaces provided by said cylinders.

Further, by this construction an annular gas expansion space 12 is provided between the casing and the cylinders 8, for the initial reception of burdened gas. The bottom of that annular space 12 is partially closed by a circumferential ring or flange 13, which rests upon the tops of the brackets 11; leaving a narrow open gap or annular slot 14 for the free downward passage of some gas and all tar caught or collected upon the inner surface 2x of the casing 2.

Next to be noted is that the arrangement shown provides a capacious gas reception and expansion space 12a, in the upper part of the casing above the cylinders 8, and communicating with the annular space 12. The burdened gas which enters the spaces 12a and 12 through the tangential nozzle 3, or equivalent means, while advantageously expanding takes on swift, whirling motion therein, and finding no escape at the top of the casing and being provided with an outlet A4 at the bottom of the casing moves downward spirally toward that outlet.

The initial centrifugal deposit and collection of tar upon the inner wall of the casing is considerable and such deposits are discharged through the slot 14, and flow downward upon that part of the casing which is below that level. The remainder of tar is caught upon the inner surfaces of the many concentric cylinders 8, the spaces 8a being traversed by and offering free passage for the greater part of the whirling gas stream. As will be apparent, the gas stream is thereby subdivided into many thin, cylindrical streams and being in whirling motion projects tar particles against the inner surfaces of the cylinders 8, which restrain or restrict the radial expansion of the gas streams.

Attention is called to the fact that the contrasting surface tensions of the tar particles and of the restraining cylindrical surfaces afforded by the thin cylinders, cause the tar particles to collect, spread upon and adhere to those surfaces, forming liquid films which spiral downward therein under the impulsion of the moving gas and the force of gravity. Likewise by reason of surface tension, the liquid accumulates at and upon the lower edges of the cylinders 8 and drips therefrom in separate masses of considerable size and therefore relatively easy to thereafter remove from the gas stream. Special means to that end will be described.

The before mentioned radial tuyère and its commonly inclined blades 10 are best shown in Fig. 6. The spreader cone 9 and the tuyère blade 10 being fixed in the downward path of the gas assist in gathering and centrifugally projecting the massed liquids against that portion of the casing which lies beneath said tuyère. Specifically this whirl promoting tuyère is employed to re-institute and augment the whirling action of the gas as it leaves the space 15 and enters the gas exit space beneath the cone 9.

Neither the ring, 13, nor the brackets, 11, nor the tuyère blades 10 are attached to the casing but do serve to space the impact element therein and also serve as guiding parts when that structure is lowered into or removed from the casing, after the manner depicted in Figs. 7 and 8.

Obviously, the gas streaming downward through the slot 14 and the streams from the spaces 8a, unite in the space 15, beneath the cylinders 8 and above the cone 9; and the propulsive force of the gas leaving the space 15 is employed to accomplish the final separation of tar and gas.

As will be apparent the gas passes downward through the relatively narrow opening 16 existing between the edge of the cone 9 and the casing 2; and the inclined blades 10 all having the same direction cause the gas to whirl vigorously against the underlying wall of the casing and thus to forcibly deposit liquid masses thereon. From that point to the bottom of the casing the liquid is subjected to still other forces, derived from the swiftly flowing gas, and is positively withheld, allowing only purified gas to escape through the outlet C3.

The element separately shown in Fig. 9 and fully illustrated in Figs. 5 and 6 here contains the gas outlet C3 of the extractor unit. That outlet is provided by a stand pipe 17 which is fixedly incorporated with the bottom head 6 of the casing 2.

The upstanding pipe 17 as employed forms the lower part of the casing into an annular pocket 18, for the collected tar T, which is drained through the before mentioned tar outlet 4.

The open upper end of the standpipe 17 fixedly bears a centrifugal separator 19, of which 20 and 21 are the tar eject pipes, the lower ends of which open into the lower part of the main collecting pocket 18.

The centrifugal element 19 comprises the whirl-promoting, barrel-like tuyère shown, which functions to whirlingly direct gas downward into the standpipe 17. Between the tuyère and the upper end of that pipe are two so-called centrifugal separating races 22 and 23 and the collecting cisterns 22' and 23', respectively belonging thereto. As shown, the eject pipes 20 and 21 drain respective cisterns 22' and 23'.

The advantage of this separator 19, particularly in this extractor unit, is that more perfectly than any other known device it serves to centrifugally separate the last residue of tar from the passing gas and performs that function with very little loss of gas pressure, so that the gas leaves the unit outlet C3 at a pressure only slightly less than that of the gas stream which enters through the tangential nozzle 3, at the top of the unit.

The gas which whirls downward against the inner wall of the casing 2 continues in whirling motion until it encounters the body of liquid T, keeping the latter stirred to prevent sedimentation, as before mentioned. The gas then whirlingly reacts in an upward direction, finally moving inward, entering the element 19 in the direction of the arrows 24.

The part 25 is a sleeve which is spaced from the inner wall of the casing, for optional use as a collector of any fine particles of tar that may remain in the whirling gas.

It is sometimes desirable to assist the operations herein-before described by tempering, heating or cooling the liquid content of the gas as or after the liquid particles impact the described surfaces. As before stated the closed tube or core part 7 may be used for that purpose and to that end is provided with pipe connections 26 and 27 through which refrigerating or heating fluids may be introduced, to cool or heat that part. All parts of the impact element are metallically united with the tube 7 and are ready conductors of heat; and by this means, the temperatures of those parts may be maintained to suit the requirements of best operation.

By preference the bottom head 6 of the unit is similarly equipped with a tempering jacket 28, and it is therefore an easy matter to keep the tar body T in easy flowing condition even when the extractor is exposed to the weather and extreme cold.

The progress of the described process, its effects and the complete operation of this apparatus have been made plain in the foregoing and therefore do not require summarization or repetition herein.

I claim:

1. The herein described apparatus for extracting liquid from gas burdened with particles thereof, comprising a suitable encased plurality of concentric thin-walled cylinders separated by spaces which are wider than a drop of said liquid, said cylinders at one end being open within the casing, means causing the burdened gas to enter and whirlingly progress between said cylinders en route to said open end, a liquid separator lodged in said casing beyond the open ends of said cylinders and forming the gas exit of the casing, additional means positioned between said cylinders and said separator and adapted to augment the whirling action of the gas in advance of said separator, and other means for the discharge of the separated liquid.

2. The herein described apparatus for extracting finely divided liquid from a stream of gas burdened therewith, comprising a vertical casing of limited diameter having a tangential gas inlet and a reception space in its upper part of substantially larger capacity than said gas inlet, in combination with concentric thin walled vertical film reception cylinders fixedly nested in said reception space, the bottoms of said cylinders opening into a gas exit space in the lower part of said casing, a liquid discharge opening in said lower part, a centrifugal liquid separator positioned in said lower part and forming the gas outlet of said casing, and means positioned between the lower ends of said cylinders and said separator and adapted to augment the whirling action of the gas in advance of said separator, for the purpose as described.

CHARLES GILBERT HAWLEY.